(12) United States Patent
Chang

(10) Patent No.: US 7,497,415 B2
(45) Date of Patent: Mar. 3, 2009

(54) WATER-DISTRIBUTING CONTROL VALVE

(75) Inventor: Chiao-Jung Chang, Changhua County (TW)

(73) Assignee: Plumart Int'l Corp., Changhua (TW)

( * ) Notice: Subject to any disclaimer, the term of this patent is extended or adjusted under 35 U.S.C. 154(b) by 30 days.

(21) Appl. No.: 11/738,468

(22) Filed: Apr. 21, 2007

(65) Prior Publication Data

US 2008/0042091 A1 Feb. 21, 2008

(30) Foreign Application Priority Data

Aug. 18, 2006 (TW) .............................. 95214614 U

(51) Int. Cl.
*F16K 5/04* (2006.01)
(52) U.S. Cl. ..................... 251/310; 251/317
(58) Field of Classification Search ................. 251/310, 251/311, 312, 317, 317.01, 316, 314
See application file for complete search history.

(56) References Cited

U.S. PATENT DOCUMENTS

| 2,433,732 | A | * | 12/1947 | Brown | ........................ 251/309 |
|---|---|---|---|---|---|
| 3,709,256 | A | * | 1/1973 | Gore et al. | ................... 251/312 |
| 4,015,816 | A | * | 4/1977 | Semon | ........................ 251/317 |
| 4,066,241 | A | * | 1/1978 | Read | ........................... 251/361 |
| 4,275,868 | A | * | 6/1981 | Crone | ......................... 251/317 |
| 5,149,054 | A | * | 9/1992 | Passerell et al. | ............. 251/309 |
| 5,188,144 | A | * | 2/1993 | Radossi | ...................... 251/317 |

* cited by examiner

*Primary Examiner*—John Bastianelli
(74) *Attorney, Agent, or Firm*—Alan Kamrath; Kamrath & Associates PA

(57) ABSTRACT

A water-distributing control valve includes a valve body, a valve shaft, at least one stop ring, a water-stop pad, a pressure distributing plate and a bolt element. The valve body includes a watering pipe extended from the outer periphery thereof and having an outlet defined therein. The valve body further includes a bore formed therein. The valve shaft inserted into the valve body includes a rotary lever disposed at the front end thereof. An arcuate slot and at least one annular groove are mounted at the intermediate section of the valve shaft. A plurality of through apertures and a receiving recess are arranged at the rear end of the valve shaft. The valve shaft includes an inlet attached on the bottom thereof. The pressure distributing plate is matingly engaged in the water-stop pad and then placed into the receiving recess together with the water-stop pad.

1 Claim, 7 Drawing Sheets

WATER-DISTRIBUTING CONTROL VALVE

BACKGROUND OF THE INVENTION

1. Field of the Invention

The present invention relates to a control valve and, more particularly, to a water-distributing control valve that may be disposed to water supply pipelines for easily controlling a water supply.

2. Description of the Prior Arts

As shown in FIGS. 1 and 2, a prior art water-distributing control valve comprises a valve body 10, a valve shaft 20, a stop ring 30, a water-stop pad 40 and a bolt element 50. The valve body 10 includes a fitting hole 101 provided on one side periphery thereof. The valve body 10 further includes an inlet 102, a first outlet 103 and a second outlet 104 individually formed on two end surfaces and another side periphery thereof and all communicating with the fitting hole 101. The valve body 10 further contains a bore 105 adjacent to the inlet 102 affixed on the end surface thereof and passing through the fitting hole 101. The valve shaft 20 includes a rotary lever 201 and an annular groove 202 both attached on the upper portion thereof. The valve shaft 20 further includes a first through aperture 203 and a second through aperture 204 both secured on the lower portion thereof and passing therethrough. A receiving recess 205 is arranged on the side periphery of the valve shaft 20 opposite to the second through aperture 204 under which an arcuate slot 206 is disposed.

In assembly, the stop ring 30 is fitted into the annular groove 202 of the valve shaft 20, and the water-stop pad 40 is engageably plugged into the receiving recess 205 of the valve shaft 20. Thereafter, the valve shaft 20 is placed into the fitting hole 101 of the valve body 10 so that the arcuate slot 206 corresponds to the bore 105. By inserting the bolt element 50 into the bore 105 and extending a apart thereof into the arcuate slot 206, the valve shaft 20 and the valve body 10 may be combined together, and the rotating angle of the valve shaft 20 may be limited. While the water-stop pad 40 controllably closes the second outlet 104 of the valve body 10, water will flow out the first outlet 103. While the water-stop pad 40 controllably closes the first outlet 103 of the valve body 10, water will flow out of the second outlet 104 instead.

However, such a prior art water-distributing control valve still has the following disadvantages:

1. The first and second through apertures 203 and 204 are both attached on the peripheral surface of the valve shaft 20. Thus the valve shaft 20 is merely adapted for the valve body 10 and cannot be used in various valve bodies with different structures.

2. As the water-stop pad 40 plugs the first or second outlet 103 and 104, the water-stop pad 40 is compressed by the water pressure to cause a deformation in response to the shape of the first or second outlet 103 or 104. The water-stop pad 40 is also scraped by the edge rims of the outlets 103 and 104 while rotating the valve shaft 20 for a water supply, thus resulting in water leakage and short service life of the valve shaft 20.

The present invention has arisen to mitigate and/or obviate the afore-described disadvantages.

SUMMARY OF THE INVENTION

The primary object of the present invention is to provide a water-distributing control valve provided at the rear end thereof with a plurality of through apertures and which includes the inlet attached on the bottom thereof and communicating with the through apertures, respectively, thereby enabling to adapt the valve shaft for use with various valve bodies with different structures.

Another object of the present invention is to provide a water-distributing control valve with the pressure distributing plate matingly engaged in the fitting indentation of the water-stop pad. Thus, the pressure distributing plate absorbs and separatedly lowers the water pressure, so as to prevent the water-stop pad from being deformed by water pressure and from being scraped by the edge rim of the outlet as the valve shaft 2 is rotatably turned.

In accordance with one aspect of the present invention, a water-distributing control valve comprises a valve body, a valve shaft, at least one stop ring, a water-stop pad, a pressure distributing plate and a bolt element. The valve body is constructed in the form of a cylinder and includes a watering pipe extended from the outer periphery thereof and having an outlet defined therein. The valve body further includes a bore formed therein. The valve shaft is inserted into one end of the valve body and includes a rotary lever disposed at the front end thereof. An arcuate slot and at least one annular groove for fitting the at least one stop ring therein are mounted at the intermediate section of the valve body. A plurality of through apertures and a receiving recess are arranged at the rear end of the valve shaft. The valve shaft further includes an inlet attached on the bottom thereof and communicating with each of the through apertures. The pressure distributing plate is matingly engaged in the water-stop pad and then placed into the receiving recess of the valve shaft together with the water-stop pad. Furthermore, by engageably inserting the bolt element into the bore of the valve body, a part of the bolt element extends out of the arcuate slot of the valve shaft. Thus, the valve shaft and the valve body may be combined as a whole, and the rotating angle of the valve shaft is limited, so as to easily control the water supply by virtue of the rotary lever.

The present invention will become more obvious from the following description when taken in connection with the accompanying drawings, which show, for purpose of illustration only, the preferred embodiments in accordance with the present invention.

DETAILED DESCRIPTION OF THE PREFERRED EMBODIMENT

Figure 1:
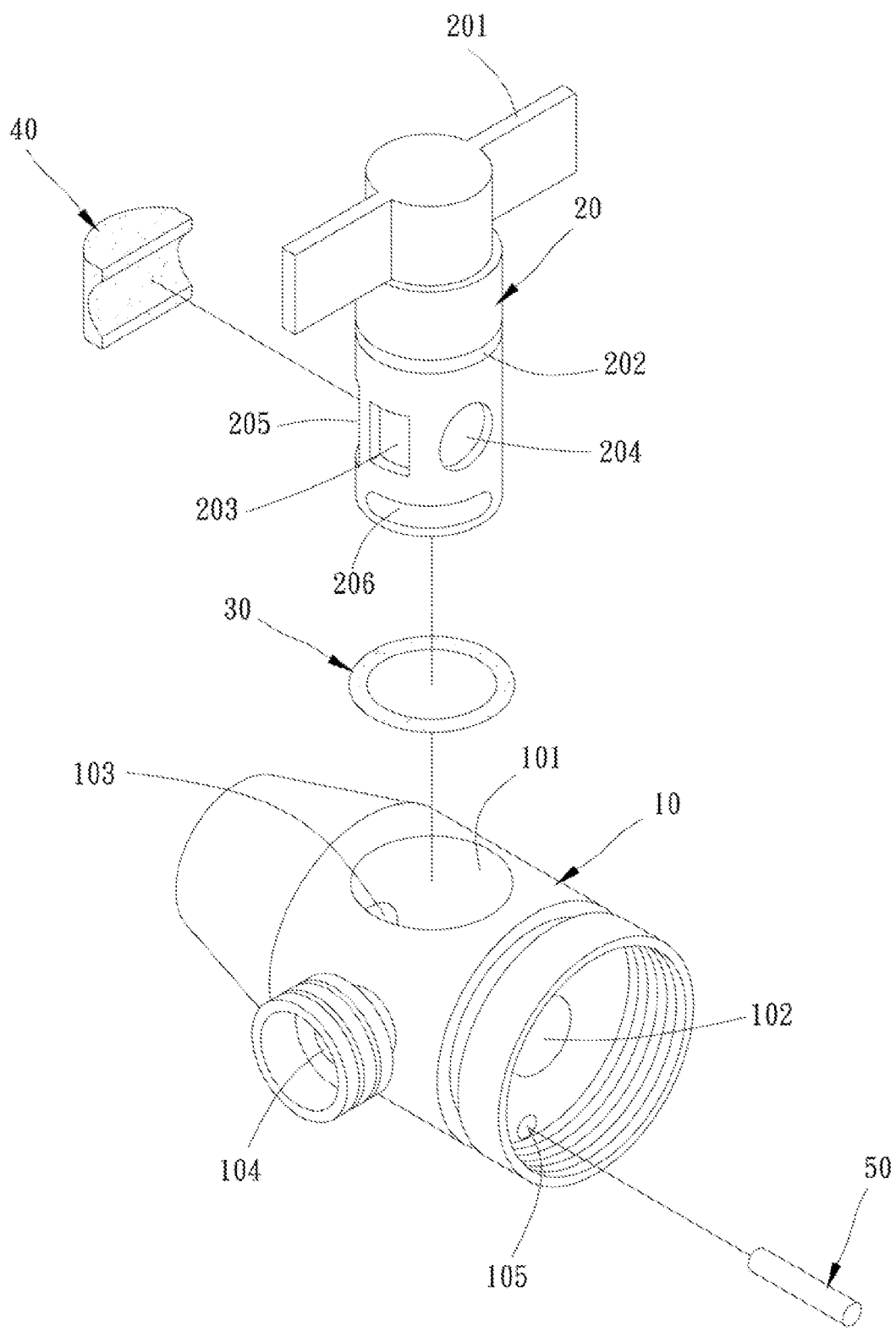
FIG. 1 is a perspective diagram illustrating the exploded components of a prior art water-distributing control valve.
Figure 2:
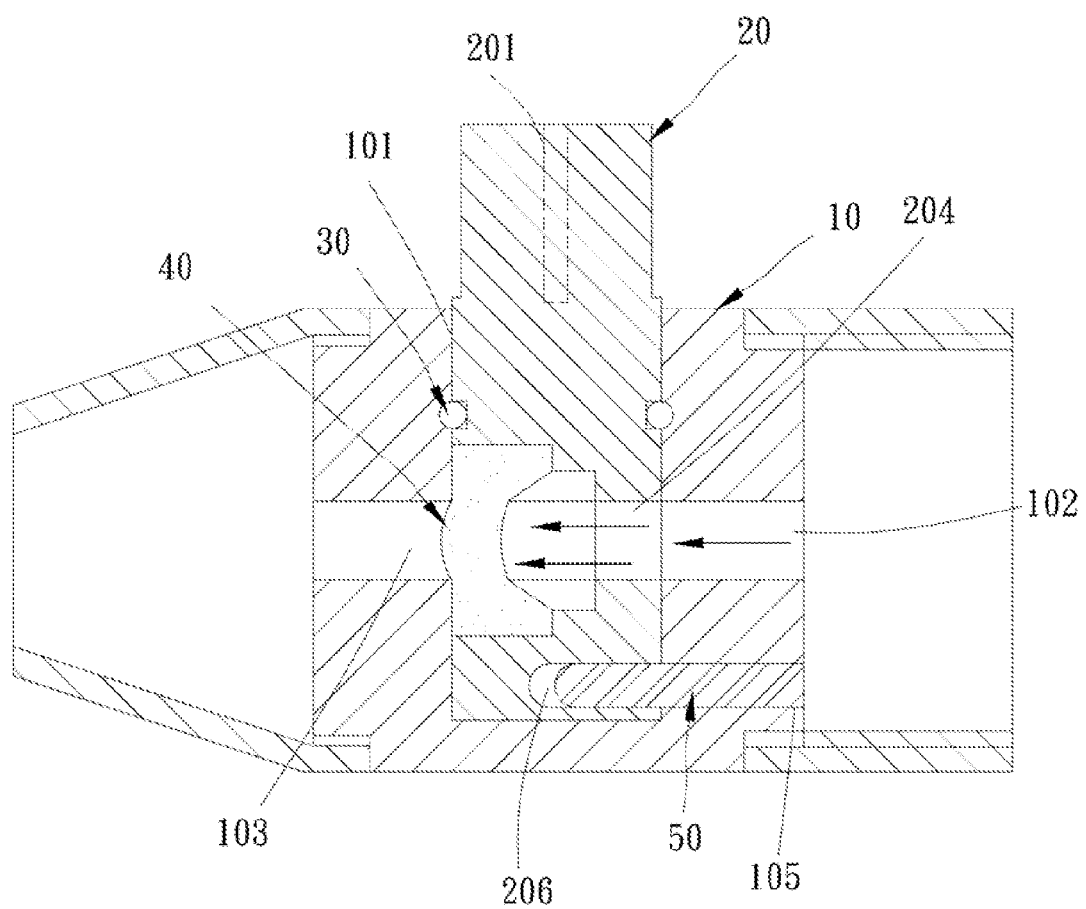
FIG. 2 is a cross sectional diagram illustrating a turn-off state of the prior art water-distributing control valve.
Figure 3:
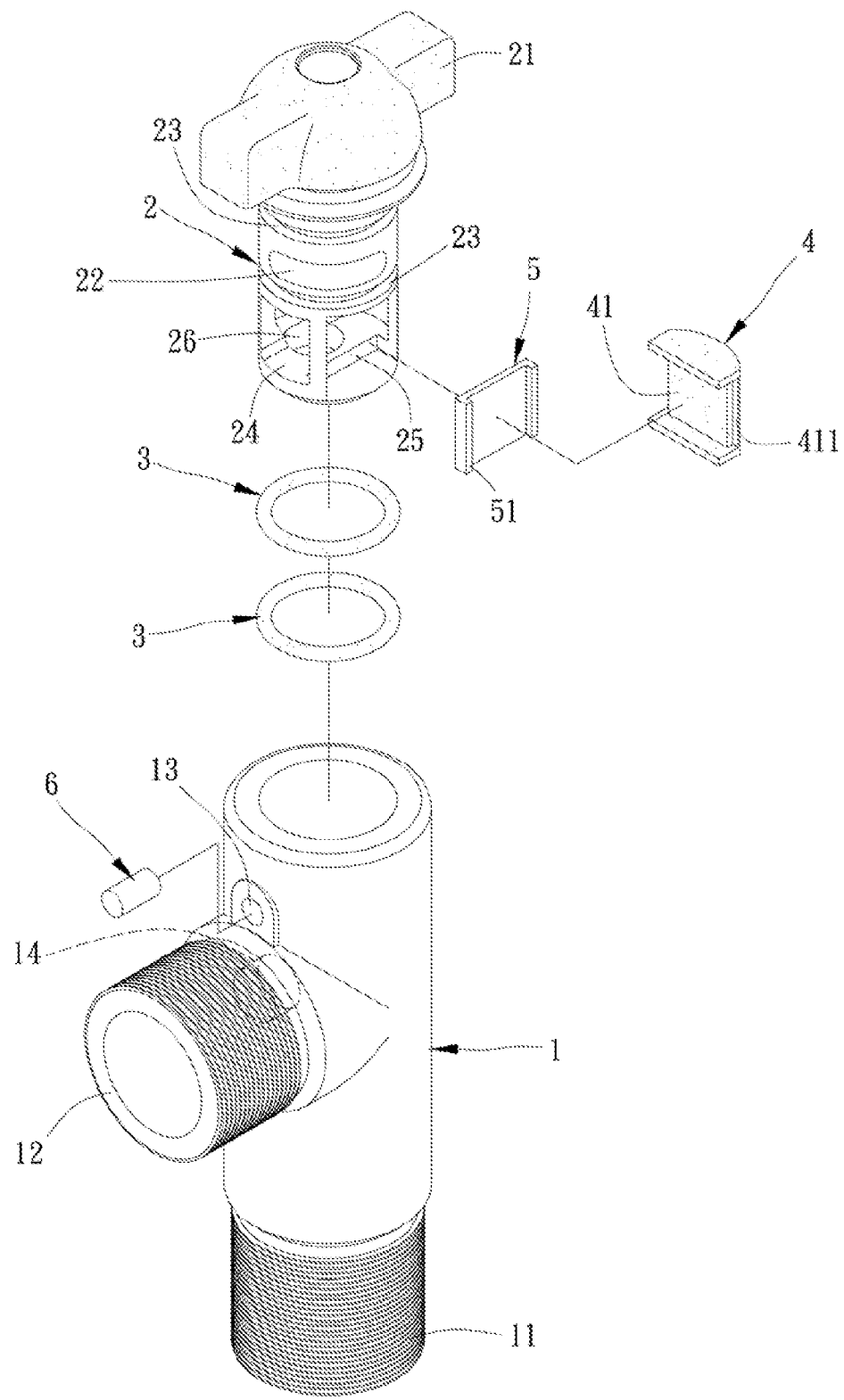
FIG. 3 is a perspective diagram illustrating the exploded components of a water-distributing control valve of a first preferred embodiment of the present invention.
Figure 4:
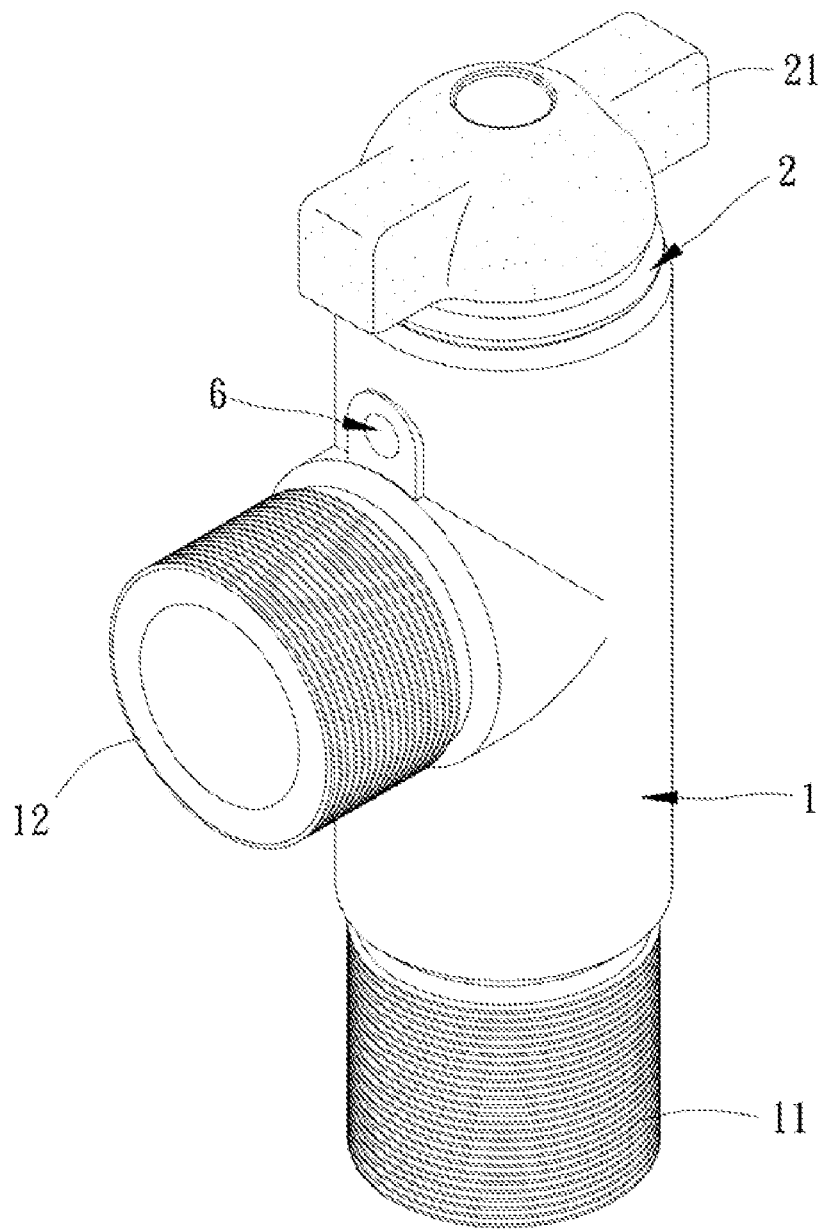
FIG. 4 is a perspective diagram illustrating the assembly of the water-distributing control valve of the first preferred embodiment of the present invention.
Figure 5:
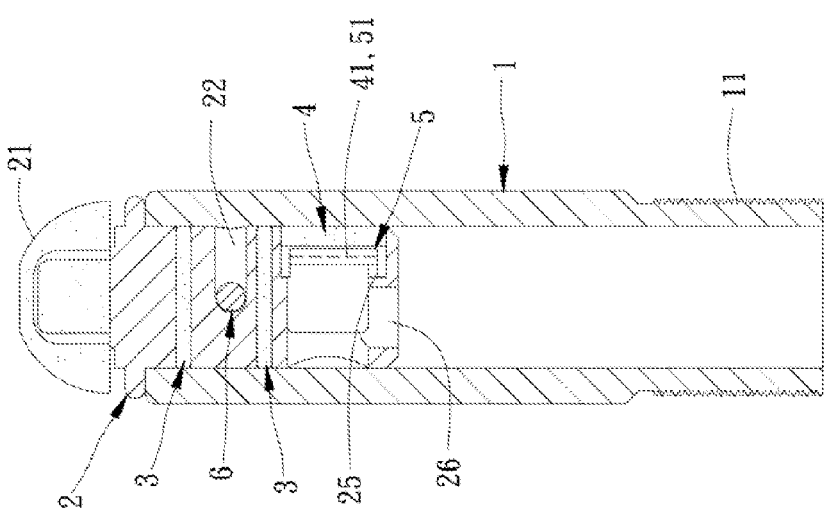
FIG. 5 is a cross sectional diagram illustrating the assembly of the water-distributing control valve of the first preferred embodiment of the present invention.

Referring to FIGS. 3-5, a water-distributing control valve in accordance with the present invention comprises a valve body 1, a valve shaft 2, two stop rings 3, a water-stop pad 4, a pressure distributing plate 5 and a bolt element 6. The valve body 1 is constructed in the form of a cylinder and includes a fastening end 11 with outer threads provided on one end thereof. The valve body further includes a watering pipe 12 extended from the outer periphery thereof and having an outlet 14 defined therein. Also, the valve body 1 includes a bore 13 formed therein. The valve shaft 2 includes a rotary lever 21 disposed at the front end thereof. An arcuate slot 22 and two annular grooves 23 are mounted at the intermediate section of the valve shaft 2. Three through apertures 24 and a receiving recess 25 are arranged at the rear end of the valve shaft 2. The valve shaft 2 further includes an inlet 26 attached on the bottom thereof and communicating with each of the three through apertures 24. The water-stop pad 4 is made of a soft plastic material and includes a fitting indentation 41 affixed therein and having a retaining segment 411 secured on each of the two ends thereof. The pressure distributing plate 5 is made of a hard plastic material and includes a locking foot 51 vertically extended from each of the two ends thereof.

In assembly, the two stop rings 3 are fitted in the two annular grooves 23 of the valve shaft 2, respectively. The pressure distributing plate 5 is matingly engaged in the fitting indentation 41 of the water-stop pad 4. After the two locking feet 51 of the pressure distributing plate 5 are individually engaged with the retaining segments 411 of the fitting indentation 41, the water-stop pad 4 and the pressure distributing plate 5 are placed into the receiving recess 25 of the valve shaft 2. Furthermore, the valve shaft 2 is inserted into the inner wall of the opposite end relative to the fastening end 11 of the valve body 1 so that the arcuate slot 22 corresponds to the bore 13. By engageably inserting a bolt element 6 into the bore 13, a part of the bolt element 6 extends out of the arcuate slot 22. Thus, the valve shaft 2 and the valve body 1 may be combined as a whole, and the rotating angle of the valve shaft 2 is limited.

Figure 6:
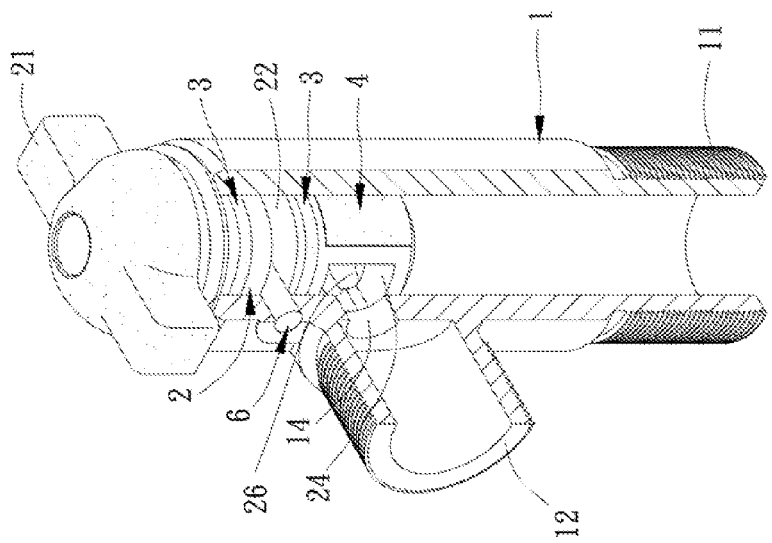
FIG. 6 is a perspective sectional diagram illustrating a turn-on state of the water-distributing control valve of the first preferred embodiment of the present invention.
Figure 7:
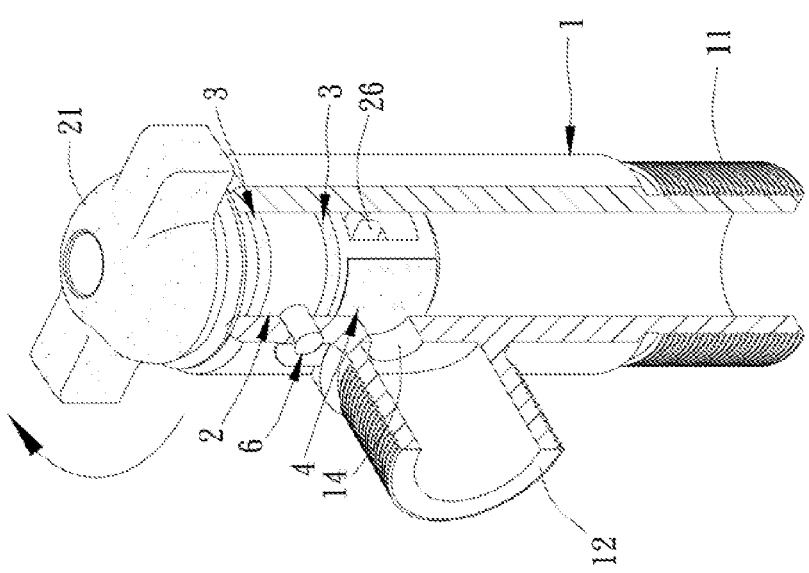
FIG. 7 is a perspective sectional diagram illustrating a turn-off state of the water-distributing control valve of the first preferred embodiment of the present invention.

As shown in FIGS. 6 and 7, if desiring to turn on the water distributing control valve for a water supply, the valve shaft 2 is controllably rotated by use of the rotary lever 21. By the movement of the bolt element 6 in the arcuate slot 22, the bolt element 6 limits the rotating angle of the valve shaft 2. Thus, the respective through holes 24 of the valve shaft 2 may rotatably correspond to the outlet 14 of the valve body 1 so that water may flow from the inlet 26 of the valve shaft 2 into the outlet 14 of the valve body 1 through the corresponding through aperture 24.

On the contrary, if desiring to turn off the water distributing control valve for stopping the water supply, the valve shaft 2 is rotated in an opposite direction by use of the rotary lever 21. By the movement of the bolt element 6 in the arcuate slot 22, the bolt element 6 limits the rotating angle of the valve shaft 2. Thus, the water-stop pad 4 placed into the receiving recess 25 may block the outlet 14 of the valve body 1, thereby stopping the water flow.

Figure 8:
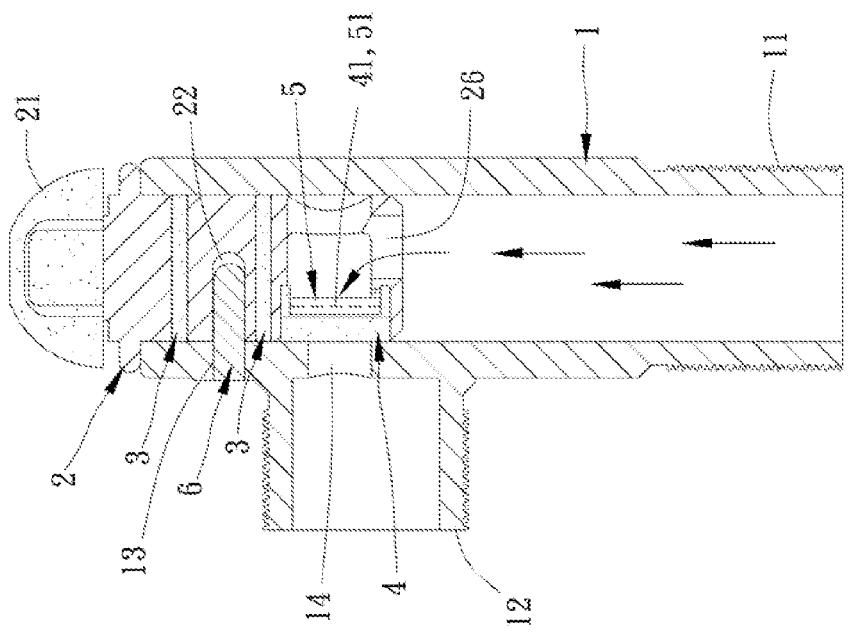
FIG. 8 is a cross sectional diagram illustrating an operational state of a pressure distributing plate of the first preferred embodiment of the present invention.

In a turn-off state of the present invention, as illustrated in FIG. 8, the pressure distributing plate 5 absorbs and separately lowers the water pressure, thus preventing the water-stop pad 4 from being compressed by the water pressure to cause a deformation in response to the shape of the outlet 14 and from being scraped by the edge rim of the outlet 14 as the valve shaft 2 is rotatably turned.

Figure 9:
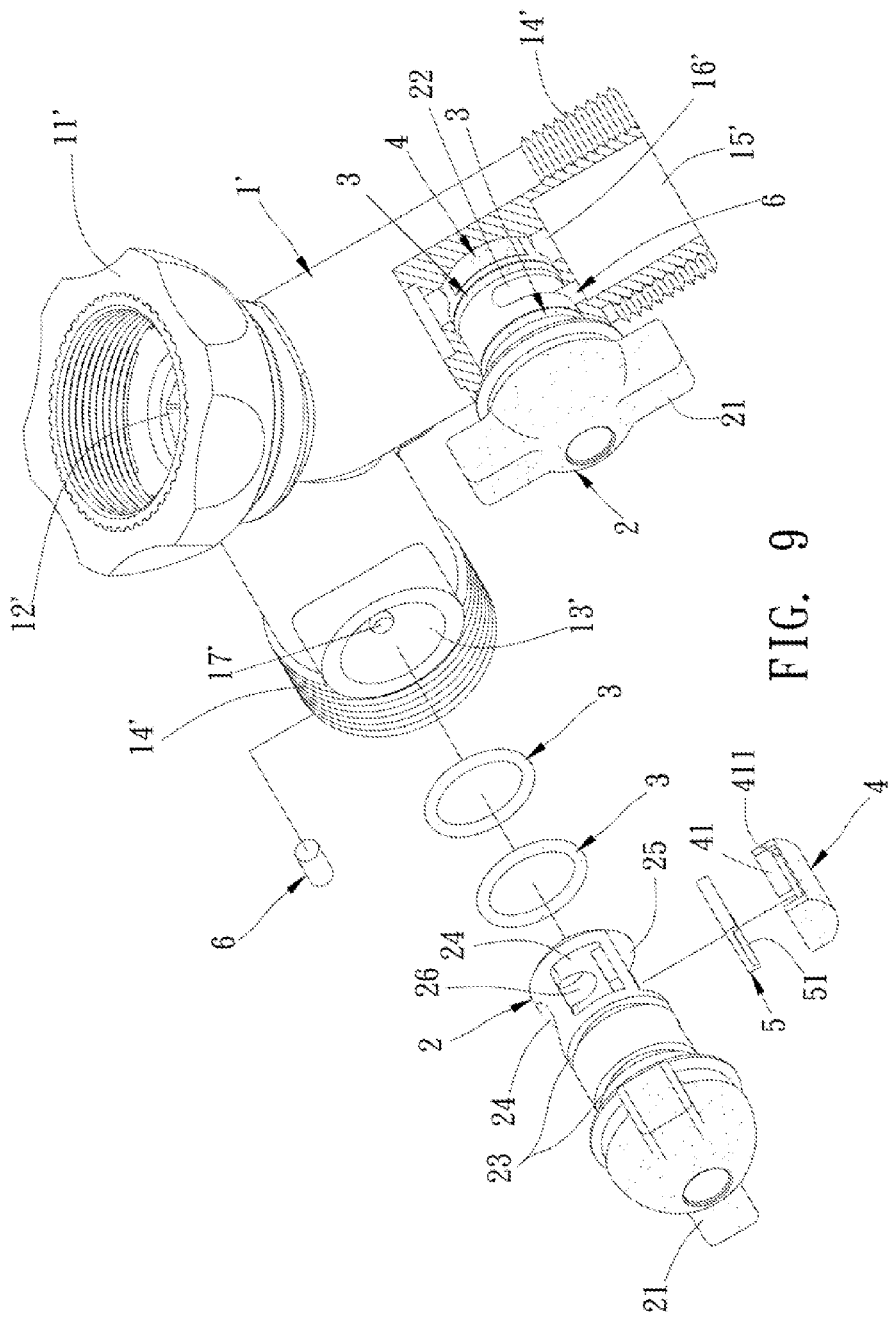
FIG. 9 is a perspective and partial sectional diagram illustrating the exploded components of a water-distributing control valve of a second preferred embodiment of the present invention.

With reference to FIG. 9, a water-distributing control valve in accordance with the present invention comprises a valve body 1', a valve shaft 2, two stop rings 3, a water-stop pad 4, a pressure distributing plate 5 and a bolt element 6. The valve body 1' is constructed in the form of a cylinder having three branch tubes fixed thereon. The first branch tube includes a mounting member 11' secured on the outer periphery thereof and a water passageway 12' provided therein. The second and third branch tubes each contain a receiving hole 13' formed in the side rim thereof. The opening end of each of the second and third branch tubes includes outer threads 14' arranged around its outer periphery and a chamber 15' defined therein. The chamber 15' includes an outlet 16' disposed in the bottom thereof and communicating with the receiving hole 13' having a bore 17' mounted therein.

In assembly, the valve shaft 2 is inserted into the receiving hole 13' of the valve body 1' so that the arcuate slot 22 corresponds to the bore 17'. BY engageably inserting a bolt element 6 into the bore 17', a part of the bolt element 6 extends out of the arcuate slot 22, thereby the valve shaft 2 and the valve body 1' may be combined as a whole and limits the rotating angle of the valve shaft 2.

If desiring to turn on the water distributing control valve for a water supply, the valve shaft 2 is controllably rotated by use of the rotary level 21. By the movement of the bolt element 6 in the arcuate slot 22, the bolt element 6 limits the rotating angle of the valve shaft 2, such that the respective through holes 24 of the valve shaft 2 may rotatably correspond to the outlet 16' of the valve body 1' so that water may flow from water passageway 12' of the valve body 1' to the outlet 16' of the valve body 1' through the corresponding through aperture 24 of the valve shaft 2.

On the contrary, if desiring to turn off the water distributing control valve for stopping the water supply, the valve shaft 2 is rotated in an opposite direction by use of the rotary lever 21. By the movement of the bolt element 6 in the arcuate slot 22, the bolt element 6 limits the rotating angle of the valve shaft 2. Thus, the water-stop pad 4 placed into the receiving recess 25 of the valve shaft 2 may block the outlet 16' of the valve body 1', thereby stopping the water flow.

It can be clearly seen from the preceding accounts on the features of the present invention that the water-distributing control valve of the present invention has the following advantages:

1. The valve shaft 2 is provided at the rear end thereof with a plurality of through apertures 24 and includes the inlet 26 attached on the bottom thereof and communicating with the through apertures 24, respectively, thereby enabling the valve shaft to be used in various valve bodies with different structures.

2. The pressure distributing plate 5 is matingly engaged in the fitting indentation 41 of the water-stop pad 4. Thus the pressure distributing plate absorbs and separatedly lowers the water pressure, thus preventing the water-stop pad 4 from being deformed by the water pressure and from being scraped by the edge rim of the outlet 14 as the valve shaft 2 is rotatably turned.

The invention is not limited to the above embodiments but various modifications thereof may be made. It will be understood by those skilled in the art that various changes in form and detail may made without departing from the scope and spirit of the present invention.

What is claimed is:

1. A water-distributing control valve comprising:

a valve body, wherein said valve body is in a form of a cylinder and includes a watering pipe extended from an outer periphery thereof and having an outlet defined therein, wherein the valve body includes a bore formed therein;

a valve shaft, wherein said valve shaft is inserted into said valve body and includes a rotary lever disposed at a front end thereof, wherein said valve shaft includes a plurality of through apertures and a receiving recess arranged at a rear end thereof, wherein the valve shaft includes an inlet attached on a bottom thereof and communicating with each of said through apertures;

at least one stop ring, wherein an arcuate slot and at least one annular groove for fitting said at least one stop ring therein are mounted at an intermediate section of the valve shaft;

a water-stop pad, wherein said water-stop pad includes a fitting indentation affixed therein wherein said fitting indentation of said water-stop pad has a retaining segment secured on each of two ends thereof, and wherein said pressure distributing plate includes a locking foot vertically extended from each of two ends thereof and individually engaged with the retaining segments of the fitting indentation with the pressure distributing plate formed of hard plastic material with the water-stop pad formed of soft plastic material;

a pressure distributing plate, wherein said pressure distributing plate is matingly engaged in said water-stop pad and placed into said receiving recess of said valve shaft together with said water-stop pad; and a bolt element, wherein said bolt element is inserted into said bore of said valve body, wherein a part of said bolt element extends out of said arcuate slot of said valve shaft.

* * * * *